(12) United States Patent
Park

(10) Patent No.: US 8,987,998 B2
(45) Date of Patent: *Mar. 24, 2015

(54) LED FLOURESCENT LAMP

(75) Inventor: Myung Koo Park, Seoul (KR)

(73) Assignees: Kumho Electric, Inc., Seoul (KR); Myung Koo Park, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/118,804

(22) PCT Filed: Jun. 3, 2011

(86) PCT No.: PCT/KR2011/004089
§ 371 (c)(1),
(2), (4) Date: Nov. 19, 2013

(87) PCT Pub. No.: WO2012/157807
PCT Pub. Date: Nov. 22, 2012

(65) Prior Publication Data
US 2014/0084793 A1 Mar. 27, 2014

(30) Foreign Application Priority Data
May 19, 2011 (KR) .......................... 10-2011-0047365

(51) Int. Cl.
*H05B 37/00* (2006.01)
*H05B 33/08* (2006.01)

(52) U.S. Cl.
CPC ........ *H05B 33/0887* (2013.01); *H05B 33/0809* (2013.01); *H05B 33/0815* (2013.01)
USPC .................... 315/227 R; 315/185 R; 315/291

(58) Field of Classification Search
USPC .......... 315/185 R, 187, 227 R, 228, 244, 291, 315/294, 299
See application file for complete search history.

(56) References Cited

U.S. PATENT DOCUMENTS 7,375,476 B2 5/2008 Walter et al.
7,825,612 B2 11/2010 Lee
(Continued)

FOREIGN PATENT DOCUMENTS

JP 2008-538053 A 10/2008
JP 2008-288207 A 11/2008
(Continued)

OTHER PUBLICATIONS

Canadian Office Action dated Nov. 28, 2014.

*Primary Examiner* — Tung X Le
(74) *Attorney, Agent, or Firm* — Rabin & Berdo, P.C.

(57) ABSTRACT

An LED fluorescent lamp includes: an LED array having a plurality of LEDs connected in series; a first connection pin and a third connection pin connected to one side of the LED array; a second connection pin and a fourth connection pin connected to the other side of the LED array; at least one pair of capacitors connected to the LED array; and a short-circuit means for connecting at least one of the first connection pin and the third connection pin, and the second connection pin and the fourth connection pin, wherein the capacitors include: a first capacitor having one end connected to the first connection pin and the other end connected to one side of the LED array; a third capacitor having one end connected to the third connection pin and the other end connected to the one side of the LED array; a second capacitor having one end connected to the second connection pin and the other end connected to the other side of the LED array; and a fourth capacitor having one end connected to the fourth connection pin and the other end connected to the other side of the LED array. The LED fluorescent lamp can use an instant start electronic ballast that is a fluorescent lamp ballast installed in an existing lamp with no change.

13 Claims, 4 Drawing Sheets

(56) References Cited

U.S. PATENT DOCUMENTS

| | | |
|---|---|---|
| 8,089,213 B2 | 1/2012 | Park |
| 8,164,268 B2 * | 4/2012 | Wei .................. 315/209 PZ |
| 2006/0226795 A1 | 10/2006 | Walter et al. |
| 2008/0054814 A1 * | 3/2008 | Deppe et al. ............ 315/192 |
| 2008/0284346 A1 | 11/2008 | Lee |
| 2010/0194296 A1 | 8/2010 | Park |
| 2011/0043134 A1 | 2/2011 | Lee |
| 2011/0163679 A1 * | 7/2011 | Chiang et al. ........... 315/185 R |
| 2012/0091906 A1 * | 4/2012 | Deppe et al. ............ 315/187 |
| 2013/0320871 A1 * | 12/2013 | Ge et al. ................ 315/200 R |
| 2014/0084793 A1 | 3/2014 | Park |

FOREIGN PATENT DOCUMENTS

| | | |
|---|---|---|
| JP | 2010-182656 A | 8/2010 |
| KR | 10-0933076 B1 | 12/2009 |
| KR | 10-2010-0042323 A | 4/2010 |
| WO | WO 2012-157807 A1 | 11/2012 |

* cited by examiner

LED FLOURESCENT LAMP

CROSS-REFERENCE TO RELATED APPLICATION

This application claims priority to and the benefit of Korean Patent Application No. 2011-0047365, filed on May 19, 2011, the disclosure of which is incorporated herein by reference in its entirety.

BACKGROUND

1. Field of the Invention

The present invention relates to a light-emitting diode (LED) fluorescent lamp and, more particularly, to a light-emitting diode (LED) fluorescent lamp capable of replacing an existing fluorescent lamp in which a conventional instant start electronic ballast is used.

2. Discussion of Related Art

With the development of technology, optical efficiency of a light-emitting diode (LED) that at one point was used only for low-power display lamps such as indicators has improved enough to be used in practical life. Further, an LED is a mercury-free eco-friendly light source unlike other light sources, and is widely spotlighted as a next-generation light source to be used for backlights of mobile phones, backlights of liquid crystal display televisions (LCD TVs), vehicle lamps, and ordinary lamps. Cost of power generation began to sharply increase in the early 2000's due to a sudden rise in price of crude petroleum. Due to the appearance of environmental issues, incandescent or fluorescent lamps that have been used as a main light source for the past 100 years have begun to be replaced with LED lamps.

An LED lamp can be replaced with an incandescent lamp of E26 base with no change. However, in the case of the fluorescent lamp occupying the main current of ordinary illumination, the fluorescent lamp itself should be exchanged, or a dedicated ballast should be separately installed. In this case, it is troublesome to change wiring in the fluorescent lamp, and thus LED lamps based on fluorescent lamps are not widely distributed.

SUMMARY OF THE INVENTION

The present invention is directed to a light-emitting diode (LED) fluorescent lamp capable of using an instant start electronic ballast for an existing fluorescent lamp without installing a separate dedicated ballast and without changing wiring.

According to an aspect of the present invention, there is provided a light-emitting diode (LED) fluorescent lamp, which includes: an LED array having a plurality of LEDs connected in series; first and third connecting pins connected to one side of the LED array; second and fourth connecting pins connected to the other side of the LED array; at least one pair of capacitors connected to the LED array; and a short-circuit means connected between the first connecting pin and the third connecting pin and/or between the second connecting pin and the fourth connecting pin. The capacitors include a first capacitor connected to the first connecting pin at one end thereof and the one side of the LED array at the other end thereof, a third capacitor connected to the third connecting pin at one end thereof and the one side of the LED array at the other end thereof, a second capacitor connected to the second connecting pin at one end thereof and the other side of the LED array at the other end thereof, and a fourth capacitor connected to the fourth connecting pin at one end thereof and the other side of the LED array at the other end thereof.

According to the LED fluorescent lamp of the present invention, an instant start electronic ballast for an existing fluorescent lamp can be used without installing a separate dedicated ballast and without changing wiring of the lamp. Thus, the existing fluorescent lamp can be replaced to use high-efficiency illumination without changing the wiring or circuit.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

In general, a basic circuit of an electronic ballast widely used for a fluorescent lamp includes an instant start circuit, a soft start circuit, and so on. A conventional choke coil ballast includes a ballast using a starter lamp, a rapid start ballast, and so on. A light-emitting diode (LED) fluorescent lamp according to the present invention is configured to be able to be applied to an instant start electronic ballast for a fluorescent lamp.

Figure 1:
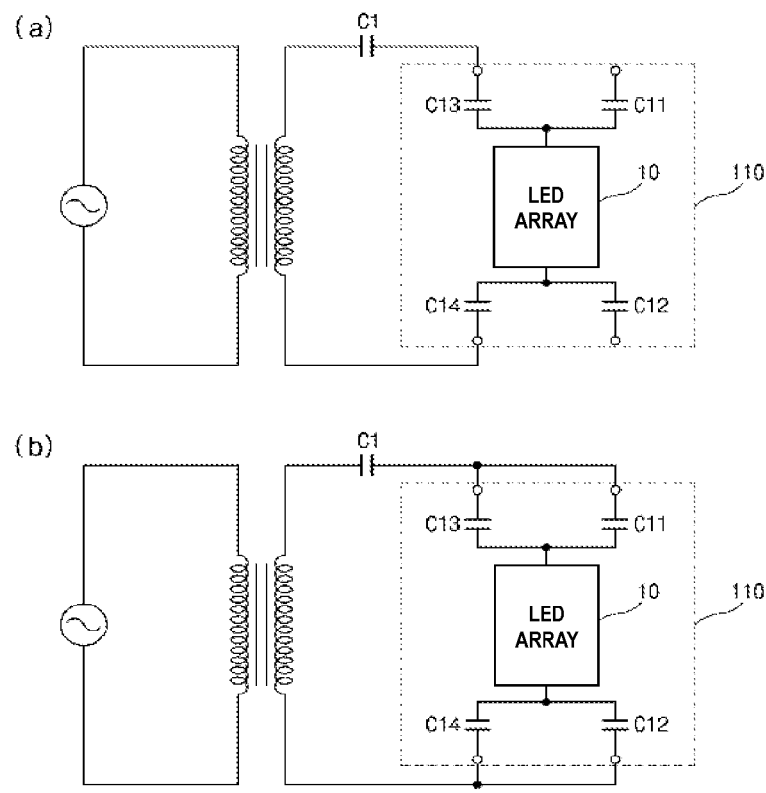
FIGS. 1(a) and 1(b) are circuit diagrams of a conventional LED fluorescent lamp connected to an instant start electronic ballast.

FIGS. 1(a) and 1(b) are circuit diagrams of a conventional LED fluorescent lamp connected to an instant start electronic ballast.

An instant start electronic ballast for a fluorescent lamp includes a transformer and capacitors, and is a type in which the fluorescent lamp is initially discharged by a high voltage induced from the transformer, and once the discharge occurs, a stabilized lamp current is controlled by a capacitor C1 connected in series to a lamp load in the ballast.

Here, such a conventional LED fluorescent lamp 110 may be an LED fluorescent lamp disclosed in Korean Patent No. 10-1002895. The conventional LED fluorescent lamp 110 may be a type in which capacitors C11, C12, C13, and C14 are connected in series between an LED array 10 and four connecting pins. When this type of LED fluorescent lamp 110 is connected to an instant start electronic ballast, a capacitor C1 in the ballast is connected in series to the capacitors inside the LED fluorescent lamp. Thus, a current flows to an LED array load when capacitance of the capacitors in the LED fluorescent lamp is changed.

Referring to FIG. 1(a), two connecting pins of the LED fluorescent lamp 110 having a typical 4-pin structure are connected to the instant start electronic ballast. In this case, the other two connecting pins are in an open state. A value of a current flowing to the LED array 10 is controlled by series complex impedance of the capacitor C1 intended to control the current in the electronic ballast and the capacitors C13 and C14 in the LED fluorescent lamp. Further, according to the connection of the LED fluorescent lamp, the series complex impedance is controlled by series connection of two of the four capacitors in the LED fluorescent lamp. Thus, the current flowing to the LED array load can be controlled by changing capacitance of the capacitors C11, C12, C13, and C14 in the LED fluorescent lamp. Here, if the capacitance of the capacitors C11 to C14 is denoted as C2 having the same capacitance, complex impedance Z can be given as follows.

$$Z = -\frac{1}{j\omega C_1} - \frac{2}{j\omega C_2}$$ Expression 1

Referring to FIG. 1(b), the conventional LED fluorescent lamp is applied to another instant start electronic ballast.

The instant start electronic ballast may have a structure in which the two pins of the 4-pin LED fluorescent lamp are open as shown in FIG. 1(a), and a structure in which the two pins of one side of the LED fluorescent lamp are short-circuited inside the LED fluorescent lamp as shown in FIG. 1(b).

When the two pins are short-circuited as shown in FIG. 1(b), the complex impedance of the capacitors for controlling the current in the LED fluorescent lamp can be given as follows. In detail, if the capacitance of the capacitors C11 to C14 is denoted as C2 having the same capacitance, the complex impedance Z including the capacitor C1 in the ballast can be given as follows.

$$Z = -\frac{1}{j\omega C_1} - \frac{1}{j\omega C_2}$$ Expression 2

However, even in the case of the same LED fluorescent lamp, depending on an internal state of the LED fluorescent lamp, i.e. whether or not the LED fluorescent lamp is connected to external socket pins, the impedance of the LED fluorescent lamp varies. As a result, power consumption of the LED fluorescent lamp may vary.

Figure 2:
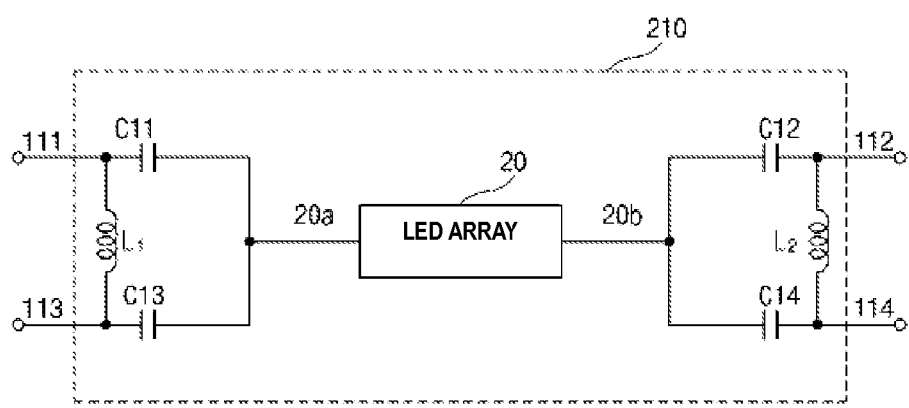
FIG. 2 is a circuit diagram of an LED fluorescent lamp according to a first embodiment of the present invention.

FIG. 2 is a circuit diagram of an LED fluorescent lamp according to a first embodiment of the present invention.

Referring to FIG. 2, the LED fluorescent lamp 210 according to the present embodiment includes an LED array 20, capacitors C11, C12, C13, and C14, and first to fourth connecting pins 111, 112, 113, and 114 that are external connecting pins. A first inductor L1 is connected between the first connecting pin 111 and the third connecting pin 113, and a second inductor L2 is connected between the second connecting pin 112 and the fourth connecting pin 114.

According to use environment, the LED array 20 may be used as a structure in which two or more LED arrays, in each of which a plurality of LEDs are connected in series, are connected in parallel. This configuration can be equally applied to an LED fluorescent lamp to be described below in accordance with another embodiment. The LED array 20 includes a plurality of LEDs connected in series, an anode-side terminal 20a, and a cathode-side terminal 20b. The capacitor C11 is connected between the anode-side terminal 20a of the LED array 20 and the first connecting pin 111, and the capacitor C12 is connected between the cathode-side terminal 20b of the LED array 20 and the second connecting pin 112. Further, the capacitor C13 is connected between the anode-side terminal 20a of the LED array 20 and the third connecting pin 113, and the capacitor C14 is connected between the cathode-side terminal 20b of the LED array 20 and the fourth connecting pin 114.

When the capacitors C11 to C14 are connected to a ballast circuit for the fluorescent lamp (which will be described below) by at least one of the first to fourth connecting pins 111, 112, 113, and 114, the capacitors C11 to C14 can change the impedance in the ballast circuit for the fluorescent lamp depending on a change in frequency, and control a current flowing to the LED fluorescent lamp 210. As such, a ballast for an existing fluorescent lamp can be used with no change.

In the LED fluorescent lamp 210 according to the present embodiment, the first inductor L1 is configured so that one end thereof is connected to the first connecting pin 111, and the other end thereof is connected to the third connecting pin 113, and the second inductor L2 is configured so that one end thereof is connected to the second connecting pin 112, and the other end thereof is connected to the fourth connecting pin 114. Here, each of the first inductor and the second inductor may have low inductance.

In the present embodiment, the first and third connecting pins and the second and fourth connecting pins are connected using the first and second inductors having the low inductance. In another embodiment, short-circuit lines may be used in place of the first and second inductors having the low inductance. Further, the number of capacitors inside the LED fluorescent lamp may be modified into at least one.

Figure 3:
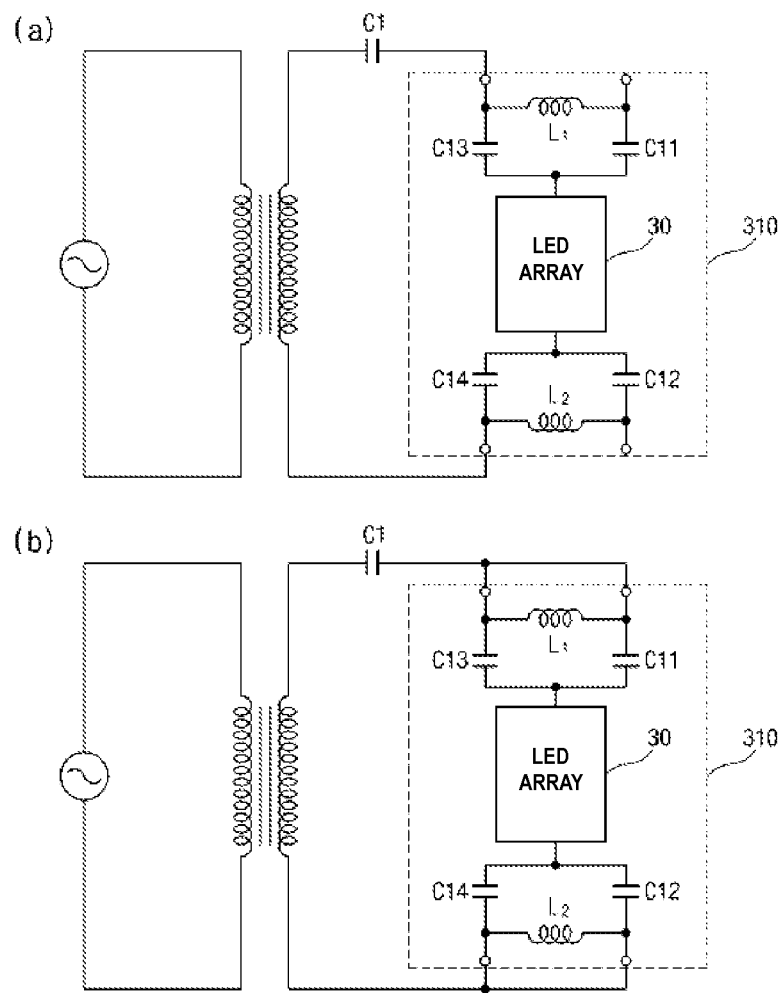
FIGS. 3(a) and 3(b) are circuit diagrams showing a state in which the LED fluorescent lamp according to the embodiment of FIG. 2 is connected to the instant start electronic ballast shown in FIGS. 1(a) and 1(b)

An effect obtained by the connection of the first and second inductor will be described with reference to FIG. 3.

FIGS. 3(a) and 3(b) are circuit diagrams showing a state in which the LED fluorescent lamp according to the embodiment of FIG. 2 is connected to the instant start electronic ballast shown in FIGS. 1(a) and 1(b). Referring to FIG. 3(a), two connecting pins of the 4-pin LED fluorescent lamp 310 as in the embodiment of FIG. 2 are connected to the instant start electronic ballast. Here, the other two connecting pins are in an open state. In this case, a value of current flowing to the LED array 30 is controlled by series complex impedance of the capacitor C1 intended to control the current in the electronic ballast and the capacitors in the LED fluorescent lamp. Thus, the current flowing to the LED array load can be controlled by changing capacitance of the capacitors C11, C12, C13, and C14 in the LED fluorescent lamp. In the present embodiment, the first capacitor C11 and the third capacitor C13 are connected in parallel by a first inductor L1, and the second capacitor C12 and the fourth capacitor C14 are connected in parallel by a second inductor L2.

As for a basic operation in the present embodiment, a transformer induces an alternating current (AC) voltage of high frequency to a secondary winding by self-oscillation, and a current flows to a path of a parallel structure in which the capacitor C1 is connected to the capacitors C13 and C11 and a path of a parallel structure in which the LED array 30 is connected to the capacitors C12 and C14 or its opposite path. Here, if the capacitance of the capacitors C11 to C14 is denoted as C2 having the same capacitance, and if the low inductance of the first and second inductors is neglected, the complex impedance Z can be equally given as in Expression 2.

Referring to FIG. 3(b), the LED fluorescent lamp according to the embodiment of FIG. 2 is connected to another instant start electronic ballast.

The instant start electronic ballast may have a structure in which the two pins of the 4-pin LED fluorescent lamp are open as shown in FIG. 3(a), and a structure in which the two pins of one side of the LED fluorescent lamp are short-circuited inside the LED fluorescent lamp as shown in FIG. 3(b).

As shown in FIG. 3(b), an example in which the two pins of one side of the LED fluorescent lamp are short-circuited inside the LED fluorescent lamp will be described. The transformer inside the ballast induces an AC voltage of high frequency to a secondary winding by self-oscillation, and a current flows to a path of a parallel structure in which the capacitor C1 is connected to the capacitors C13 and C11 and a path of a parallel structure in which the LED array 30 is connected to the capacitors C12 and C14 or its opposite path.

Here, if the capacitance of the capacitors C11 to C14 is denoted as C2 having the same capacitance, and if the low inductance of the first and second inductors is neglected, the complex impedance Z can be equally given as in Expression 2.

Thus, when the LED fluorescent lamp as in the embodiment of FIG. 2 is used, the complex impedance for controlling the current in the LED fluorescent lamp can be equally provided for any instant start electronic ballast to which the LED fluorescent lamp is connected. Thus, it is possible to realize the LED fluorescent lamp having a stable uniform optical characteristic.

Table 1 below shows results of comparing power consumption and current values measured when each of the LED fluorescent lamp having a conventional 2-pin open type, the LED fluorescent lamp having a 1-pin open/1-pin short-circuit type of one embodiment of the present invention, and the LED fluorescent lamp having a 2-pin short-circuit type of another embodiment of the present invention is connected to the instant start electronic ballasts shown in FIG. 1(a) and FIG. 3(a). The LED array used in the present embodiment is to connect 48 LEDs in series. For each capacitor in the LED fluorescent lamp, a capacitor having a capacitance of 2000 pF is used.

TABLE 1

|  | 2-pin open | 1-pin open/1-pin short-circuit | 2-pin short-circuit |
| --- | --- | --- | --- |
| Power consumption | 22.0 W | 24.1 W | 26.8 W |
| Lamp current | 143.4 mA (AC) | 159.9 mA (AC) | 180.8 mA (AC) |
| LED current | 109.1 mA (DC) | 121.6 mA (DC) | 137.5 mA (DC) |
| Operating frequency | 70.4 kHz | 68.8 kHz | 66.9 kHz |

It can be seen from Table 1 that the power consumption and the current flowing through the lamp are increased, and the operating frequency is reduced when the LED fluorescent lamp having a 1-pin open/1-pin short-circuit type of one embodiment of the present invention and the LED fluorescent lamp having a 2-pin short-circuit type of another embodiment of the present invention are connected to the instant start electronic ballast, compared to when the LED fluorescent lamp having a conventional 2-pin open type is connected to the instant start electronic ballast. In other words, it is possible to obtain a more stable uniform optical characteristic when the LED fluorescent lamp according to one embodiment of the present invention is used than when the conventional LED fluorescent lamp is used.

Figure 4:
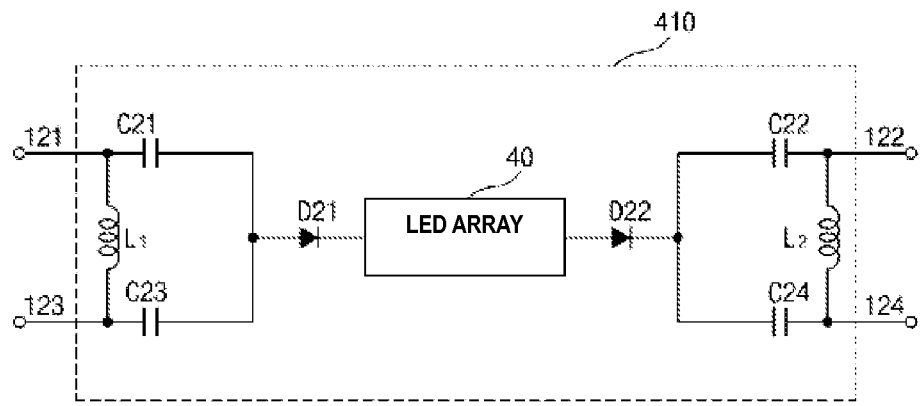
FIG. 4 is a circuit diagram of an LED fluorescent lamp according to another embodiment of the present invention.

FIG. 4 is a circuit diagram of an LED fluorescent lamp according to another embodiment of the present invention. Referring to FIG. 4, the LED fluorescent lamp 410 according to the present embodiment is different from the LED fluorescent lamp according to the embodiment of FIG. 2 in that diodes D21 and D22 are additionally connected in series to opposite terminals of the LED array 40. According to a use environment, only one of the diodes D21 and D22 may be added. The diodes D21 and D22 cause a current to flow to the LED array 40 only in a forward direction. Thus, when a Zener diode is connected in parallel to the LED array 40, it is possible to prevent a power loss caused by a current flowing through the Zener diode in a negative (−) period.

Figure 5:
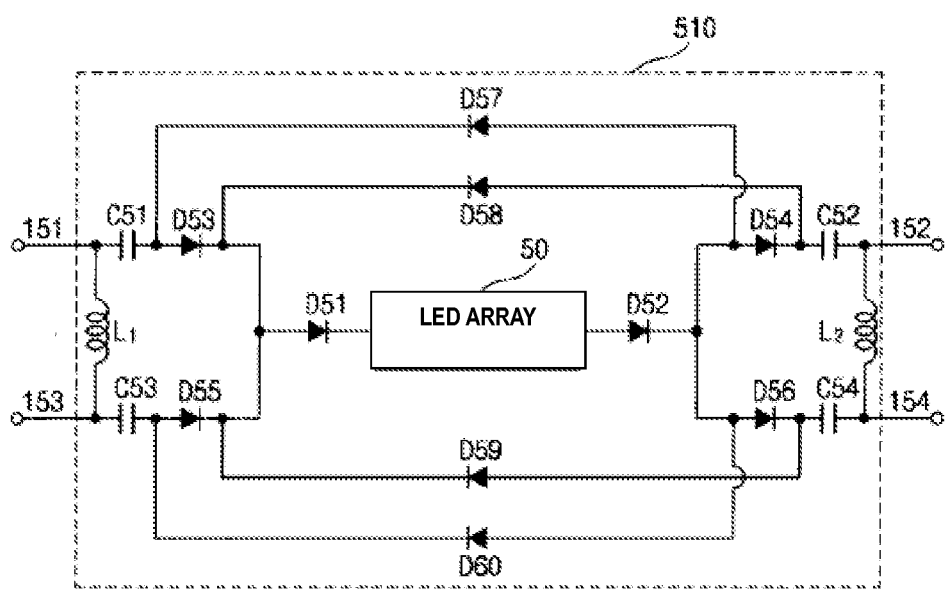
FIG. 5 is a circuit diagram of an LED fluorescent lamp according to yet another embodiment of the present invention.

FIG. 5 is a circuit diagram of an LED fluorescent lamp according to yet another embodiment of the present invention. The LED fluorescent lamp 510 according to the present embodiment is configured so that diodes D53 to D56 are additionally connected in series to capacitors C51 to C54 connected to first to fourth connecting pins 151, 152, 153, and 154, respectively. The diodes D53 to D56 allow the LED fluorescent lamp 510 according to the present embodiment to be operated along with diodes D57 to D60 regardless of an AC voltage phase in ballasts for various fluorescent lamps.

When used, the LED fluorescent lamp having the configuration as described above can be connected to ballasts for all fluorescent lamps used previously without a separate circuit change.

Figure 6:
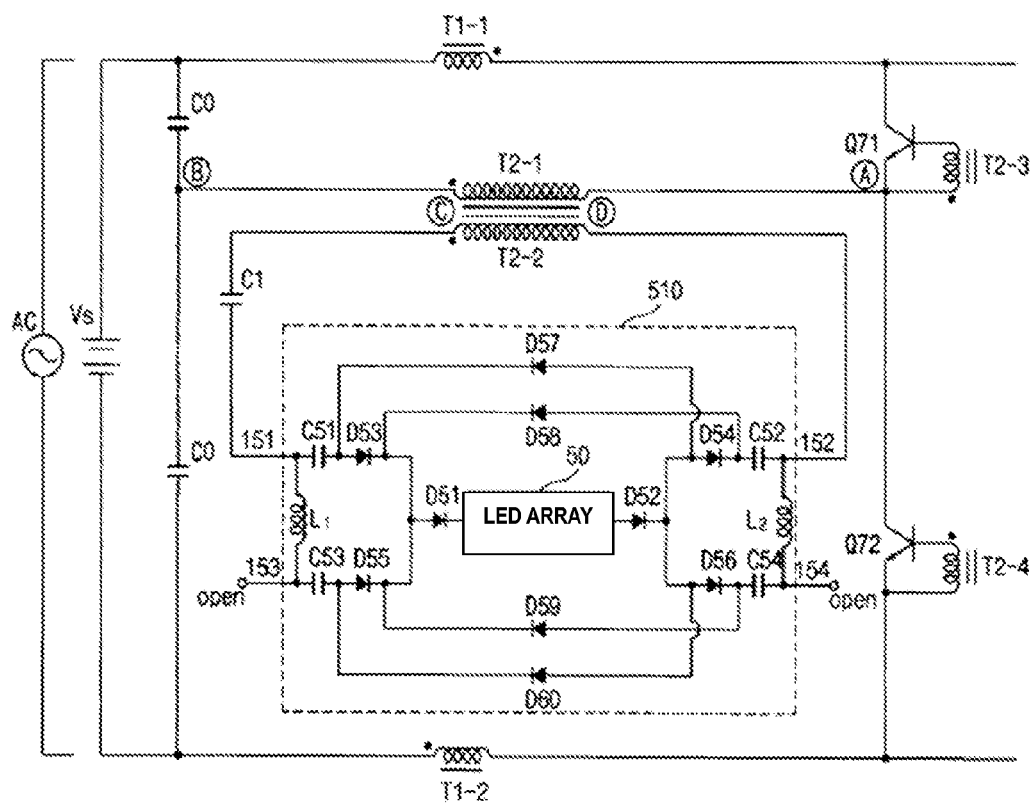
FIG. 6 shows a circuit when the LED fluorescent lamp according to the embodiment of FIG. 5 is used for an instant start electronic ballast for a fluorescent lamp.

FIG. 6 shows a circuit when the LED fluorescent lamp according to the embodiment of FIG. 5 is used for an instant start electronic ballast for a fluorescent lamp. Referring to FIG. 6, the instant start electronic ballast for the fluorescent lamp is a type in which switching elements Q71 and Q72 are caused to sustain a switching operation by self-oscillation of a circuit made up of transformers T1 and T2 and capacitors C, a primary winding T2-1 of a transformer T2 is connected to a middle node B that is tapped between capacitors C0 and is connected in series to a switching node A whose output is in a short-circuited state in terms of AC and is ½ Vs in terms of DC, the fluorescent lamp is initially discharged by high voltage induced in a secondary winding T2-2 of the transformer T2, and after the discharge occurs, a stabilized lamp current is controlled by a capacitor C1 connected in series to a lamp load.

When such an electronic ballast is used, output terminals of the electronic ballast are connected to a first connecting pin 151 and a second connecting pin 152. In this case, a basic operation is as follows. The transformer T2 induces AC voltage of high frequency in the secondary winding T2-2 by self-oscillation. When a node C has a positive (+) potential with respect to a node D, a current flows to a path of C-C1-((C51-D53) and (L1-C53-D55))-D51-LED array 50-D52-((D54-C52) and (D56-C54-L2))-D. When the node C has a negative (−) potential, a current flows to a path of D-((C52-D58) and (L2-C54-D59))-D51-LED array 50-D52-((D57-C51) and (D60-C53-L1))-C1-C.

Thus, the value of a current flowing to the LED array 50 is controlled by series complex impedance of a parallel structure of the current control capacitor C1 in the electronic ballast and capacitors C51 and C53 and a parallel structure of the capacitor C1 and capacitors C52 and C54. The current flowing to the LED array can be controlled by changing capacitance of the capacitor C51 to C54 inside the LED fluorescent lamp.

Here, if the capacitance of the capacitor C51 to C54 is denoted as C2, and if inductance of inductors L1 and L2 is neglected, the complex impedance Z can be given as follows.

$$Z = -\frac{1}{j\omega C_1} - \frac{1}{j\omega C_2}$$

In other words, it is possible to obtain the same impedance as in Expression 2.

In this way, the LED fluorescent lamp according to the present invention can be applied to the instant start electronic ballast with no change of the circuit. Further, the LED fluorescent lamp according to the present invention is not limited by the embodiments described above. To variously modify the embodiments, the embodiments can be combined in whole or in part.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A light-emitting diode (LED) lamp comprising:
    an LED array having a plurality of LEDs connected in series;
    first and third connecting pins connected to a first side of the LED array;
    second and fourth connecting pins connected to a second side of the LED array;
    at least one pair of capacitors connected to the LED array; and
    at least one of a first short-circuit means and a second short-circuit means, the first short-circuit means being connected between the first connecting pin and the third connecting pin and the second short-circuit means being connected between the second connecting pin and the fourth connecting pin,
    wherein at least one pair of capacitors include
    a first capacitor having a first end connected to the first connecting pin and a second end connected to the first side of the LED array, a third capacitor having a first end connected to the third connecting pin and a second end connected to the first side of the LED array, and
    a second capacitor having a first end connected to the second connecting pin and a second end connected to the second side of the LED array, and a fourth capacitor having a first end connected to the fourth connecting pin and a second end connected to the second side of the LED array, and
    wherein the first short-circuit means is connected to a first line between the first connecting pin and the first capacitor and a third line between the third connecting pin and the third capacitor, and the second short-circuit means is connected to a second line between the second connecting in and the second capacitor and a fourth line between the fourth connecting pin and the fourth capacitor.

2. The LED lamp of claim 1, wherein the first short-circuit means includes a first inductor connected between the first connecting pin and the third connecting pin, and the second short-circuit means includes a second inductor connected between the second connecting pin and the fourth connecting pin.

3. The LED lamp of claim 1, further comprising at least one of a first diode whose an anode is connected to the second end of the first capacitor and the second end of the third capacitor and whose a cathode is connected to the first side of the LED array, and a second diode whose a cathode is connected to the second end of the second capacitor and the second end of the fourth capacitor and whose an anode is connected to the second side of the LED array.

4. The LED lamp of claim 3, further comprising at least one of a third diode whose an anode is connected to the second end of the first capacitor and whose a cathode is connected to the anode of the first diode, a fourth diode whose a cathode is connected to the second end of the second capacitor and whose an anode is connected to the cathode of the second diode, a fifth diode whose an anode is connected to the second end of the third capacitor and whose a cathode is connected to the anode of the first diode, and a sixth diode whose a cathode is connected to the second end of the fourth capacitor and whose an anode is connected to the cathode of the second diode.

5. The LED lamp of claim 4, further comprising a seventh diode whose an anode is connected to the anode of the fourth diode and whose a cathode is connected to the second end of the first capacitor, an eighth diode whose an anode is connected to the second end of the second capacitor and whose a cathode is connected to the cathode of the third diode, a ninth diode whose an anode is connected to the second end of the fourth capacitor and whose a cathode is connected to the cathode of the fifth diode, and a tenth diode whose an anode is connected to the anode of the sixth diode and whose a cathode is connected to the second end of the third capacitor.

6. The LED lamp of claim 1, further comprising at least one of a third diode whose an anode is connected to the second end of the first capacitor and whose a cathode is connected to the first side of the LED array, a fourth diode whose a cathode is connected to the second end of the second capacitor and whose an anode is connected to the second side of the LED array, a fifth diode whose an anode is connected to the second end of the third capacitor and whose a cathode is connected to the first side of the LED array, and a sixth diode whose a cathode is connected to the second end of the fourth capacitor and whose an anode is connected to the second side of the LED array.

7. The LED lamp of claim 6, further comprising a seventh diode whose an anode is connected to the anode of the fourth diode and whose a cathode is connected to the second end of the first capacitor, an eighth diode whose an anode is connected to the second end of the second capacitor and whose a cathode is connected to the cathode of the third diode, a ninth diode whose an anode is connected to the second end of the fourth capacitor and whose a cathode is connected to the cathode of the fifth diode, and a tenth diode whose an anode is connected to the anode of the sixth diode and whose a cathode is connected to the second end of the third capacitor.

8. A light-emitting diode (LED) lamp comprising:
    an LED array having a plurality of LEDs connected in series;
    first and third connecting pins connected to a first side of the LED array;
    second and fourth connecting pins connected to a second side of the LED array;
    at least one of a first short-circuit means and a second short-circuit means, the first short-circuit means being connected between the first connecting pin and the third connecting pin and the second short-circuit means being connected between the second connecting pin and the fourth connecting pin, the first short-circuit means and the second short-circuit means being an inductor; and at least one pair of capacitors connected to the LED array, said at least one pair of capacitors including a first capacitor having a first end connected to the first connecting pin and a second end connected to the first side of the LED array, a third capacitor having a first end connected to the third connecting pin and a second end connected to the first side of the LED array, and a second capacitor having a first end connected to the second connecting pin and a second end connected to the second side of the LED array, and a fourth capacitor having a first end connected to the fourth connecting pin and a second end connected to the second side of the LED array.

9. The LED lamp of claim 8, further comprising at least one of a first diode whose an anode is connected to the second end of the first capacitor and the second end of the third capacitor and whose a cathode is connected to the first side of the LED array, and a second diode whose a cathode is connected to the second end of the second capacitor and the second end of the fourth capacitor and whose an anode is connected to the second side of the LED array.

10. The LED lamp of claim 9, further comprising at least one of a third diode whose an anode is connected to the second end of the first capacitor and whose a cathode is connected to the anode of the first diode, a fourth diode whose a cathode is connected to the second end of the second capacitor and whose an anode is connected to the cathode of the second diode, a fifth diode whose an anode is connected to the second end of the third capacitor and whose a cathode is connected to the anode of the first diode, and a sixth diode whose a cathode is connected to the second end of the fourth capacitor and whose an anode is connected to the cathode of the second diode.

11. The LED lamp of claim 10, further comprising a seventh diode whose an anode is connected to the anode of the fourth diode and whose a cathode is connected to the second end of the first capacitor, an eighth diode whose an anode is connected to the second end of the second capacitor and whose a cathode is connected to the cathode of the third diode, a ninth diode whose an anode is connected to the second end of the fourth capacitor and whose a cathode is connected to the cathode of the fifth diode, and a tenth diode whose an anode is connected to the anode of the sixth diode and whose a cathode is connected to the second end of the third capacitor.

12. The LED lamp of claim 8, further comprising at least one of a third diode whose an anode is connected to the second end of the first capacitor and whose a cathode is connected to the first side of the LED array, a fourth diode whose a cathode is connected to the second end of the second capacitor and whose an anode is connected to the second side of the LED array, a fifth diode whose an anode is connected to the second end of the third capacitor and whose a cathode is connected to the first side of the LED array, and a sixth diode whose a cathode is connected to the second end of the fourth capacitor and whose an anode is connected to the second side of the LED array.

13. The LED fluorescent lamp of claim 12, further comprising a seventh diode whose an anode is connected to the anode of the fourth diode and whose a cathode is connected to the second end of the first capacitor, an eighth diode whose an anode is connected to the second end of the second capacitor and whose a cathode is connected to the cathode of the third diode, a ninth diode whose an anode is connected to the second end of the fourth capacitor and whose a cathode is connected to the cathode of the fifth diode, and a tenth diode whose an anode is connected to the anode of the sixth diode and whose a cathode is connected to the second end of the third capacitor.

\* \* \* \* \*